United States Patent [19]
Yoneya et al.

[11] 3,968,519
[45] July 6, 1976

[54] AMPLIFIER WITH HOWLING-PREVENTING CIRCUIT

[75] Inventors: Juho Yoneya; Isamu Inagaki, both of Tokyo, Japan

[73] Assignee: Sony Corporation, Tokyo, Japan

[22] Filed: May 30, 1975

[21] Appl. No.: 582,286

[30] Foreign Application Priority Data
June 12, 1974  Japan.......................... 49-68082[U]

[52] U.S. Cl..................................... 360/62; 360/68
[51] Int. Cl.²..................... G11B 15/02; G11B 5/02
[58] Field of Search .................. 360/62, 61, 67, 68, 360/5, 6

[56] References Cited
UNITED STATES PATENTS

| | | | |
|---|---|---|---|
| 3,330,915 | 7/1967 | Roberts................................. | 360/62 |
| 3,347,996 | 10/1967 | Uchikoshi............................. | 360/62 |
| 3,798,385 | 3/1974 | Saito..................................... | 360/61 |
| 3,801,963 | 4/1974 | Chen..................................... | 360/5 |
| 3,889,289 | 6/1975 | Kubach................................. | 360/6 |

*Primary Examiner*—Bernard Konick
*Assistant Examiner*—Jay P. Lucas
*Attorney, Agent, or Firm*—Lewis H. Eslinger; Alvin Sinderbrand

[57] ABSTRACT

An amplifier, for example, of a tape recording and reproducing apparatus, has a first smoothing power circuit for supplying DC power to operate the amplifying circuit when connected to an AC power source, and a second smoothing power circuit also adapted for connection to the AC power source for supplying DC power to operate other elements of the apparatus, such as, an oscillator for the bias signal to be applied to the recording head and/or an alarm for indicating the exhaustion of the tape, and also to energize a relay coil or the like by which change-over switches are actuated to their position for the recording mode of operation of the apparatus, with the first and second smoothing power circuits respectively having relatively large and small discharging time constants when disconnected from the AC power source so that, if the smoothing power circuits are disconnected from the AC power source while the apparatus is in its recording mode, the change-over switches may be returned to their positions for the reproducing or playback mode of the apparatus while the amplifying circuit is still operative to produce howling. Such howling is prevented by providing an amplifier, as aforesaid, with a holding circuit which detects the disconnection of the smoothing power circuits from the AC power source and, in response thereto, is effective to hold the change-over switches in their recording mode positions until the DC voltage applied to the amplifying circuit has declined sufficiently to render the latter inoperative.

13 Claims, 2 Drawing Figures

AMPLIFIER WITH HOWLING-PREVENTING CIRCUIT

BACKGROUND OF THE INVENTION

1. Field of the Invention

This invention relates generally to amplifiers, and more particularly is directed to improvements in amplifiers having change-over switches associated therewith for selecting different operating modes.

2. Description of the Prior Art

Various types of apparatus exist in which an amplifier is associated with circuits having change-over switches driven by relays for selecting the operating mode of the apparatus. For example, in existing tape recording and reproducing apparatus, relays are energized for selecting the recording mode of operation so that, if the apparatus is inadvertently or erroneously disconnected from the usual AC power source during a recording operation, the relays are deenergized to return the change-over switches to their positions for the reproducing or play-back mode of operation. Further, the existing apparatus usually has a first smoothing power circuit for supplying DC power to operate those elements, such as, the amplifying circuit, in which relatively small currents flow, and a second smoothing power circuit for supplying DC power to energize those elements, such as, the change-over switch relays, bias oscillator and end-of-tape alarm, in which relatively large currents flow, with the first and second smoothing power circuits having relatively large and small discharging time constants, respectively, when disconnected from the AC power source. As a result of the foregoing, if the apparatus is inadvertently disconnected from the AC power source while in the recording mode, the change-over switches are returned to the positions for the reproducing mode while the DC power applied to the amplifying circuit is still sufficient to cause operation of the latter, with the result that "howling" occurs. If such howling is to be avoided, it is necessary that the change-over from the recording mode to the reproducing mode be delayed, following inadvertent disconnection from the AC power source, until the DC voltage applied to the amplifying circuit, and particularly to the preamplifier therein, has declined to a level at which at least the pre-amplifier is no longer operative.

Similarly, in other types of apparatus including an amplifier associated with circuits having relay driven change-over switches for selecting the operating mode, it is desirable that the responses of such change-over switches to inadvertent disconnection from an AC power source be delayed or occur in a predetermined order.

OBJECTS AND SUMMARY OF THE INVENTION

Accordingly, it is an object of this invention to provide an amplifying circuit having change-over switches driven by relays or other electrically energized actuators for selecting the operating mode, and in which one or more of the change-over switches may be held in the position corresponding to the energized condition of its relay or actuator for a predetermined time after disconnection from an AC power source.

More specifically, it is an object of the invention to provide a tape recording and reproducing apparatus, as aforesaid, with means for preventing howling when the apparatus is disconnected from its AC power source during a recording operation.

Another object is to provide a tape recording and reproducing apparatus, as aforesaid, with a holding circuit which detects the disconnection of the apparatus from its AC power source during a recording operation, and, in response thereto, is effective to delay the switching of the change-over switches to their positions for the reproducing mode until the DC voltage applied to the amplifying circuit has declined sufficiently to render the latter inoperative.

In accordance with an aspect of this invention, an apparatus is provided with an amplifying circuit, a first smoothing power circuit adapted to be connected to an AC power source for supplying DC power to the amplifying circuit so as to operate the latter and having a relatively large discharging time constant when disconnected from the AC power source, change-over switch means having first and second states, relay or other actuating means for the change-over switch means energizable to drive the change-over switch means to the first state thereof and permitting the return of the change-over switch means to the second state upon deenergizing of the actuating means, a second smoothing power circuit also adapted to be connected to the AC power source for supplying DC power to energize the actuating means and having a relatively small discharging time constant when disconnected from the AC power source, and holding circuit means connected with the first smoothing power circuit through the change-over switch means in said first state of the latter to maintain the energizing of the actuating means, and thereby hold the change-over switch means in its first state, for a predetermined time after the first and second smoothing power circuits are disconnected from said AC power source, which time is established by the relatively large discharging time constant of the first smoothing power circuit.

The above, and other objects, features and advantages of the invention, will be apparent in the following detail description of an illustrative embodiment thereof which is to be read in connection with the accompanying drawing.

DESCRIPTION OF A PREFERRED EMBODIMENT

Figure 1:
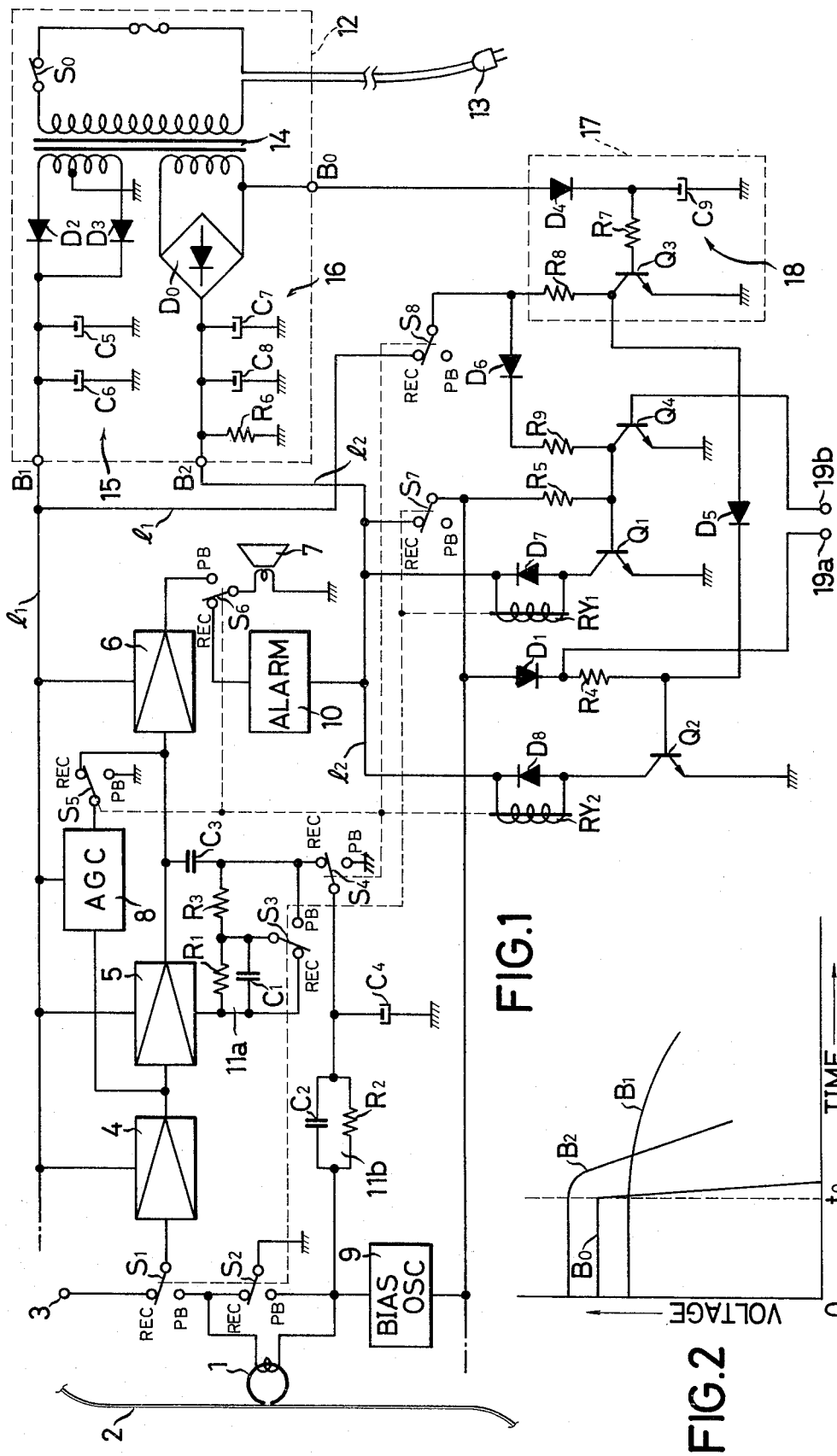
FIG. 1 is a circuit diagram illustrating an embodiment of this invention applied to a tape recording and reproducing apparatus.

Referring to FIG. 1 in which the invention is shown applied to a tape recording and/or reproducing apparatus, it will be seen that such apparatus includes a magnetic recording and/or reproducing head 1 engageable with a magnetic tape 2 which is conventionally driven during recording and reproducing operations so as to move relative to head 1. During a recording operation, head 1 is effective to record on tape 2 signals which are received at an input terminal 3, for example, from a microphone (not shown), with such input signals being suitably amplified prior to recording by means of an amplifying circuit shown to include a preamplifier 4 and an amplifier 5 connected in series. During a reproducing or playback operation of the apparatus, signals recorded on tape 2 are reproduced by head 1 and passed through the amplifying circuit constituted by the preamplifier 4 and amplifier 5, and further by an output amplifier 6, to a speaker or electro-audio transducer 7 by which audible sounds are produced. The illustrated apparatus is further shown to generally include an automatic gain control (AGC) circuit 8 for controlling the gain of the amplifying circuit in the recording mode of operation, a bias oscillator 9 for applying the usual bias signal to head 1, and a conventional alarm signal generating circuit 10 which, in the recording mode of operation, is operative to apply an alarm signal to speaker 7 for causing the latter to sound an audible alarm when the supply of tape has been exhausted.

As shown, the recording and reproducing apparatus may further desirably include a reproducing equalizer 11a which conventionally consists of a parallel circuit of a capacitor $C_1$ and a resistor $R_1$ connected, at one end, through a resistor $R_3$ and a capacitor $C_3$ to an output terminal of an output transistor (not shown) in amplifier 5, while the other end of reproducing equalizer 11a is connected to the emitter of a first stage transistor (not shown) in amplifier 5. Further, a recording equalizer 11b conventionally made up of a parallel circuit of a capacitor $C_2$ and a resistor $R_2$ is connected in the recording mode of operation, as hereinafter described, between the output of amplifier 5 and head 1.

A power circuit 12 for operating the illustrated recording and reproducing apparatus is shown to generally comprise a plug 13 for connection to a AC power source, such as, the usual receptacle connected to household electric lines, a power transformer 14 having an input winding connected to plug 13 through a power switch $S_o$, a first smoothing or rectifying power circuit 15 connected to a secondary winding of transformer 14 for providing DC power at an output terminal $B_1$, and a second smoothing or rectifying power circuit 16 connected to another secondary winding of transformer 14 for providing DC power at a second output terminal $B_2$. The first smoothing power circuit 15 is shown to include rectifying diodes $D_2$ and $D_3$ connected in parallel to the opposite ends of the respective transformer secondary winding which has a central tap connected to ground, and smoothing capacitors $C_5$ and $C_6$. The second smoothing power circuit 16 is shown to include a full-wave rectifying diode circuit $D_o$ connected to the respective secondary transformer winding, and smoothing capacitors $C_7$ and $C_8$ and a resistor $R_6$. The DC power obtained at terminal or source $B_1$ from circuit 15 when power switch $S_o$ is closed and plug 13 is connected to an AC power source is used mainly for operating those components or circuits of the apparatus having small-current flows therein. Thus, it will be seen that a circuit $l_1$ continuously connects the DC power source or terminal $B_1$ to preamplifier 4, amplifier 5, output amplifier 6 and AGC circuit 8 for operating such components of the amplifying circuit. On the other hand, the DC power obtained at the source or terminal $B_2$ from the second smoothing power circuit 16 when power circuit 12 is connected to an AC power source is used mainly for operating circuits or components of the apparatus in which relatively large currents flow, such as, the bias oscillator 9, the alarm signal generating circuit 10, solenoids (not shown) by which the driving of the tape and/or the movement of head 1 into and out of engagement with tape 2 are conventionally controlled, and relays $RY_1$ and $RY_2$ for actuating change-over switches $S_1$, $S_2$, $S_3$, $S_4$, $S_5$, $S_6$, $S_7$ and $S_8$ by which the recording and reproducing modes of operation of the apparatus are selectively established, as hereinafter described in detail.

In the event that smoothing power circuits 15 and 16 are inadvertently disconnected from the AC power source, particularly during a recording operation of the apparatus, for example, by opening of power switch $S_o$ or by removal of plug 13 from the receptacle with which it was engaged, such smoothing power circuits 15 and 16 have substantially different discharging time constants. More specifically, as shown on FIG. 2, if the smoothing power circuits 15 and 16 are disconnected from the AC power source at the time $t_o$, the DC voltage appearing at the output terminal $B_1$ of circuit 15, which has a relatively large discharging time constant, will decrease relatively slowly, as indicated by the curve $B_1$ on FIG. 2, whereas, the DC voltage appearing at the output terminal $B_2$ of circuit 16, which has a relatively small discharging time constant, will decrease rapidly, as indicated by the curve $B_2$ on FIG. 2.

As shown, each of the change-over switches $S_1$–$S_8$ has a movable contact which is selectively engageable with fixed contacts REC and PB in a first or recording state and in a second or reproducing state, respectively, for establishing the recording and playback or reproducing modes of operation, respectively, of the apparatus. More particularly, as shown, switch $S_1$ has its movable contact connected to the input of preamplifier 4, while its REC and PB contacts are respectively connected to terminal 3 for receiving input signals from a microphone and to head 1 for receiving input signals reproduced from the tape 2. Switch $S_2$ has its movable contact connected to ground, while its REC and PB contacts are respectively connected to opposite ends of the usual winding of head 1. Switch $S_3$ has its movable contact connected to the end of reproducing equalizer 11a which is connected to resistor $R_3$ and its REC contact connected to the opposite end of the reproducing equalizer, while the PB contact of switch $S_3$ is connected to a connection point between capacitor $C_3$ and resistor $R_3$. It will be apparent that, when switch $S_3$ is in its first or recording state, reproducing equalizer 11a is in its inoperative condition whereas, when switch $S_3$ is in its second or reproducing state, reproducing equalizer 11a is made operative.

The recording equalizer 11b is connected, at one end, to the same end of the winding of head 1 as the PB contact of switch $S_2$, while the other end of recording equalizer 11b is connected to the movable contact of switch $S_4$ which is further connected to ground through a capacitor $C_4$. The PB contact of that switch is connected to the output of amplifier 5 through capacitor $C_3$. Thus, when switch $S_4$ is in its first or recording state, the output of amplifier 5 is applied to head 1 through recording equalizer 11b, whereas, when switch $S_4$ is in its second or reproducing state, recording equalizer 11b is connected to ground through contact PB of switch $S_4$ and, hence, is made inoperative.

Switch $S_5$ is shown to have its movable contact connected to the input of AGC circuit 8, while the REC and PB contacts of switch $S_5$ are respectively connected to the output of amplifier 5 and to ground. Thus, when switch $S_5$ is in its first or recording state, AGC circuit 8 is operative to automatically control the gain of amplifier 5, whereas, when switch $S_5$ is in its second or reproducing state, AGC circuit 8 is made inoperative.

Switch $S_6$ has its movable contact connected to the operating or driving coil of speaker 7, while REC and PB contacts of switch $S_6$ are respectively connected to the output of alarm signal generating circuit 10 and the output of output amplifier 6. Therefore, when switch $S_6$ is in its first or recording state, the output of circuit 10 is connected to speaker 7 to cause the latter to sound an alarm when the exhaustion or end of the tape is conventionally detected. On the other hand, when switch $S_6$ is in its second or reproducing state, the output of amplifier 6 is connected to speaker 7 so that the latter will produce sounds corresponding to the signals being reproduced from tape 2.

As indicated schematically by broken lines on FIG. 1, change-over switches $S_1$, $S_2$, $S_3$ and $S_7$ are all actuated by relay $RY_1$ so as to be driven to their first or recording states in response to the energizing of the respective relay, and so as to return to their second or reproducing states upon the deenergizing of relay $RY_1$. Similarly, as indicated schematically by broken lines on FIG. 1, change-over switches $S_4$, $S_5$, $S_6$ and $S_8$ are all actuated by relay $RY_2$ so as to be driven to their first or recording states in response to the energizing of that relay and to return to their second or reproducing states upon the deenergizing of relay $RY_2$.

In order to control the energizing of relays $RY_1$ and $RY_2$, a circuit $l_2$ permanently connects output terminal $B_2$ of smoothing power circuit 16 to the coils of relays $RY_1$ and $RY_2$, at one end of the latter, while the opposite ends of the coils of relays $RY_1$ and $RY_2$ are connected to the collectors of transistors $Q_1$ and $Q_2$, respectively, which transistors have their emitters connected to ground. Therefore, relays $RY_1$ and $RY_2$ are energizable by the DC voltage provided at terminal $B_2$ only when the respective transistors $Q_1$ and $Q_2$ which control such energization are turned ON or rendered conductive. Further, as shown, change-over switch $S_7$ has its REC contact connected through circuit $l_2$ to terminal $B_2$ while its PB contact is open. The movable contact of switch $S_7$ is shown to be connected through resistor $R_5$ to the base of transistor $Q_1$, and through diode $D_1$ and resistor $R_4$ to the base of transistor $Q_2$. Further, the movable contact of switch $S_7$ is connected to bias oscillator 9. Therefore, when switch $S_7$ is driven to its first or recording state, as shown on the drawing, in response to the energizing of relay $RY_1$, DC voltage is applied from terminal $B_2$ to the base of transistor $Q_1$ and the base of transistor $Q_2$ for turning ON such transistors and maintaining the energization of relays $RY_1$ and $RY_2$. Further, in its first or recording state, switch $S_7$ applies DC voltage from terminal $B_2$ to bias oscillator 9 for operating the latter. The change-over switch $S_8$ is shown to have its REC contact connected through circuit $l_1$ with output terminal $B_1$ of smoothing power circuit 15, while the PB contact of switch $S_8$ is open and its movable contact is connected through a diode $D_6$ and a resistor $R_9$ to the base of transistor $Q_1$. Diodes $D_7$ and $D_8$ are connected in parallel with the coils of relays $RY_1$ and $RY_2$, respectively, and are polarized to prevent reverse-current flows through such coils.

In order to provide for the initiation of a recording operation of the apparatus, the latter has a terminal $19a$ adapted to receive a record-initiation pulse signal and being connected to the circuit between diode $D_1$ and resistor $R_4$ so as to apply such pulse signal through resistor $R_4$ to the base of transistor $Q_2$. In order to halt a recording operation of the apparatus and to return the same to the reproducing mode of operation, the apparatus further has a terminal $19b$ adapted to receive a record-releasing pulse signal and being connected to the base of an additional transistor $Q_4$ which has its emitter connected to ground and its collector connected to the end of resistor $R_9$ remote from diode $D_6$.

To the extent that the apparatus illustrated on FIG. 1 has been described above, the same operates as follows:

Assuming that change-over switches $S_1$–$S_8$ are all initially in their reproducing states, that is, have their movable contacts engaged with the respective PB contacts, and that power switch $S_o$ is closed for connecting smoothing power circuits 15 and 16 to the AC power source, the application of a record-initiation pulse signal to terminal $19a$, for example, in response to manual actuation of a respective push-button switch (not shown), will cause such pulse signal to be applied through resistor $R_4$ to the base of transistor $Q_2$ so as to turn ON the latter. The turning ON of transistor $Q_2$ causes energization of relay $RY_2$ by the DC voltage at the output terminal $B_2$ of smoothing power circuit 16. The energizing of relay $RY_2$ causes change-over of switches $S_4$, $S_5$, $S_6$ and $S_8$ to their recording states, as shown on FIG. 1, with the result that the DC voltage from output terminal $B_1$ of smoothing power circuit 15 is applied through switch $S_8$, diode $D_6$ and resistor $R_9$ to the base of transistor $Q_1$ for turning ON the latter and thereby causing energizing of relay $RY_1$ by the DC voltage at terminal $B_2$. Such energizing of relay $RY_1$ causes change-over of switches $S_1$, $S_2$, $S_3$ and $S_7$ to their recording states, as shown on FIG. 1, with the result that the DC voltage from terminal $B_2$ is thereafter applied through switch $S_7$ and resistor $R_5$ to the base of transistor $Q_1$, and also through switch $S_7$, diode $D_1$ and resistor $R_4$ to the base of transistor $Q_2$, whereby to hold or maintain each of transistors $Q_1$ and $Q_2$ in its ON or conductive state for maintaining the energizing of relays $RY_1$ and $RY_2$. The foregoing establishes the recording mode of operation of the apparatus. In such recording mode of operation, signals received at terminal 3 from a microphone or the like are passed through switch $S_1$ to preamplifier 4 and amplifier 5 and, from the output of the latter through switch $S_4$ and recording equalizer 11b to head 1 which also receives a bias signal from oscillator 9 made operative through switch $S_7$. Thus, the input signals are recorded by head 1 on magnetic tape 2. During such recording operation, the AGC circuit is made operative through switch $S_5$, while the alarm signal generating circuit 10 is connected through switch $S_6$ with speaker 7 for providing the desired audible alarm when the end of the tape is detected.

When a record-releasing pulse signal is applied to terminal $19b$ for halting a recording operation and restoring the apparatus to its play-back or reproducing mode of operation, such pulse signal is applied from terminal $19b$ to the base of transistor $Q_4$ for turning ON the latter with the result that the potential at the base of transistor $Q_1$ is reduced substantially to that of the ground potential so as to turn OFF transistor $Q_1$. When transistor $Q_1$ is thereby turned OFF or rendered nonconductive, relay $RY_1$ controlled by transistor $Q_1$ deenergized and the corresponding switches $S_1$, $S_2$, $S_3$ and $S_7$ are returned to their second or reproducing state, that is, are switches or changed-over so as to have their movable contacts engaged with the respective PB contacts. When switch $S_7$ is thus changed-over to engage its movable contact with its open PB contact, the bases of transistors $Q_1$ and $Q_2$ are disconnected from terminal $B_2$ so as to turn OFF transistor $Q_2$ and to maintain transistor $Q_1$ in its OFF state at the conclusion of the record-releasing pulse signal. When transistor $Q_2$ is turned OFF, as aforesaid, the corresponding relay $RY_2$ is deenergized so that the respective switches $S_4$, $S_5$, $S_6$ and $S_8$ are changed-over or returned to their second or reproducing states in which the movable contacts of such switches engage the respective PB contacts. Upon the return of switch $S_8$ to its reproducing state, the circuit for connecting the base of transistor $Q_1$ to terminal $B_1$ by way of diode $D_6$ and resistor $R_9$ is disconnected at switch $S_8$. Therefore, the reproducing mode of operation of the apparatus is established.

In such reproducing mode of operation, signals recorded on tape 2 and being reproduced by head 1 are applied through switch $S_1$ to pre-amplifier 4, and from the latter through amplifier 5 and output amplifier 6 to speaker 7 by way of switch $S_6$. In the reproducing mode of operation, reproducing equalizer $11a$ is made operative through switch $S_3$, while recording equalizer $11b$ is made inoperative through switch $S_4$, AGC circuit 8 is made inoperative through switch $S_5$, alarm signal generating circuit 10 is disconnected from speaker 7 at switch $S_6$ and bias oscillator 9 is deenergized or made inoperative at switch $S_7$.

If the power smoothing circuits 15 and 16 are disconnected from the AC power source, for example, by inadvertently or erroneously opening power switch $S_o$ or removing plug 13 from the electrical receptacle, while the apparatus is in its recording mode of operation, the DC voltage at the terminal $B_1$ drops relatively slowly, while the DC voltage at the terminal $B_2$ drops relatively rapidly from the time $t_o$ (FIG. 2) when the smoothing power circuits are disconnected from the AC power source. In response to the relatively rapid decrease in the voltage at terminal $B_2$ applied through switch $S_7$, diode $D_1$ and resistor $R_4$ to the base of transistor $Q_2$ is turned OFF so as to deenergize relay $RY_2$ with the result that switches $S_4$, $S_5$, $S_6$ and $S_8$ are changed-over to their reproducing states. Such change-over of switch $S_8$ opens the circuit from terminal $B_1$ to the base of transistor $Q_1$ by way of diode $D_6$ and resistor $R_9$ so that the rapid decrease in the voltage applied from terminal $B_2$ through switch $S_7$ and resistor $R_5$ to the base of transistor $Q_1$ is also effective to turn OFF transistor $Q_1$. The turning OFF of transistor $Q_1$ is effective to deenergize relay $RY_1$ with the result that the corresponding switches $S_1$, $S_2$, $S_3$ and $S_7$ are also changed-over to their reproducing states. It will be noted that the relays $RY_1$ and $RY_2$ are deenergized to return all of the switches $S_1$–$S_8$ to their reproducing states at a time when the slowly decreasing DC voltage at terminal $B_1$ is still at a sufficiently high level to continue the operation of the amplifying circuit constituted by preamplifier 4, amplifier 5 and output amplifier 6 with the result that howling occurs.

In order to avoid such howling when the smoothing power circuits 15 and 16 are inadvertently disconnected from the AC power source while the apparatus is in its recording mode of operation, such apparatus is further provided, in accordance with this invention, with a holding circuit 17 which is operative to hold the change-over switches $S_1$–$S_8$ in their recording states for a predetermined time after the circuits 15 and 16 have been disconnected from the AC power source. More specifically, the holding circuit 17 provided in accordance with this invention is effective to delay the change-over of switches $S_1$–$S_8$ from their recording states to their reproducing states in response to disconnection of the smoothing power circuits from the AC power source until such time as the DC voltage at terminal $B_1$ has declined sufficiently to render the amplifying circuit, and particularly at least the preamplifier 4 thereof, inoperative.

In the illustrated embodiment of the invention, the holding circuit 17 for preventing howling, as aforesaid, is shown to include a transistor $Q_3$, and a half-wave rectifying circuit 18 comprised of a diode $D_4$ and resistor $R_7$ connected in series between a power source $B_o$ and the base of transistor $Q_3$ and a capacitor $C_9$ of relatively small capacity connected to ground from a connection point between diode $D_4$ and resistor $R_7$. The power source or terminal $B_o$ is shown to be connected to one of the secondary windings of power transformer 14, and more specifically to one end of the secondary transformer winding associated with smoothing power circuit 16. The emitter of transistor $Q_3$ is shown to be connected to ground while the collector of transistor $Q_3$ is connected through a resistor $R_8$ with the movable contact of switch $S_8$, and through a diode $D_5$ with the base of transistor $Q_2$.

It will be understood that, when AC power is applied to transformer 14 by the engagement of plug 13 in an electrical receptacle or socket and the closing of power switch $S_o$, the voltage applied to the base of transistor $Q_3$ from the power source or terminal $B_o$ by way of rectifying circuit 18 is sufficient to maintain transistor $Q_3$ in its ON state so that the voltage at the collector of transistor $Q_3$ is substantially zero and, in any case, is sufficiently low as to be checked by diode $D_5$ and hence not applied to the base of transistor $Q_2$. Accordingly, when the apparatus is in either its recording or reproducing mode of operation and the smoothing power circuits 15 and 16 are connected to the AC power source, the holding circuit 17 provided in accordance with this invention does not affect either the recording or reproducing operation of the apparatus, as previously described herein.

Figure 2:
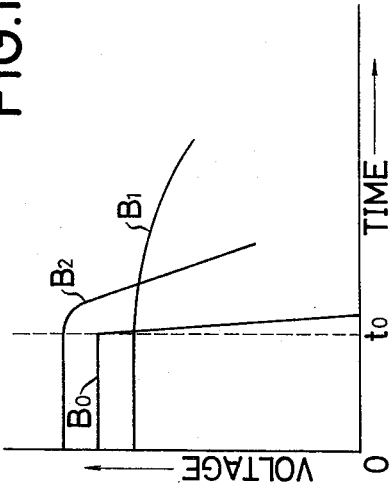
FIG. 2 is a graph showing voltage changes occurring at various locations in the circuits of FIG. 1 upon disconnection from the AC power source, and to which reference will be made in explaining the operation of the apparatus.

However, the capacity of capacitor $C_9$ in the half-wave rectifying circuit 18 is selected to be sufficiently small so that, if smoothing power circuits 15 and 16 are inadvertently disconnected from the AC power source, as described above, when the apparatus is in its recording mode of operation, the voltage applied from terminal $B_o$ to the base of transistor $Q_3$ will drop very sharply or quickly from the time $t_o$ of such disconnection, as indicated at $B_o$ on FIG. 2. By reason of such very sharp drop in the voltage applied to the base of transistor $Q_3$ when the smoothing power circuits are disconnected from the AC power source, transistor $Q_3$ is almost immediately turned OFF with the result that the output voltage of transistor $Q_3$, that is, at the collector of transistor $Q_3$, is raised by reason of the connection of the collector to terminal $B_1$ by way of switch $S_8$ and resistor $R_8$, and the raised voltage at the collector of transistor $Q_3$ is applied through diode $D_5$ to the base of transistor $Q_2$ for maintaining the latter in its ON state substantially beyond the time when the transistor $Q_2$ would otherwise be turned OFF by the decrease in the voltage applied to its base from terminal $B_2$ through switch $S_7$, diode $D_1$ and resistor $R_4$. Accordingly, transistor $Q_2$ remains ON for continuing the energizing of relay $RY_2$ and thereby keeping the corresponding switches $S_4$, $S_5$, $S_6$ and $S_8$ in their recording states until the slowly decreasing DC voltage at terminal $B_1$ has been reduced to a level at which at least preamplifier 4, and preferably also amplifiers 5 and 6 are made inoperative. During such time as the energizing of relay $RY_2$ is continued in response to the detection by holding circuit 17 of the inadvertent disconnection of the circuits from the AC power source, the positioning of switch $S_8$ in its recording state serves to apply the slowly decreasing voltage from terminal $B_1$ through switch $S_8$, diode $D_6$ and resistor $R_9$ to the base of transistor $Q_1$ so that the change-over of the latter from its ON state to its OFF state is also delayed to similarly delay the deenergizing of relay $RY_1$. Therefore, the change-over of switches $S_1$, $S_2$, $S_3$ and $S_7$ from their recording states to their playback or reproducing states in response to deenergizing of relay $RY_1$ is also delayed until such time as the level of the DC voltage at terminal $B_1$ has declined below the level required for operation of amplifiers 4, 5 and 6.

By reason of the foregoing operation of holding circuit 17, that is, the delaying of the change-over of switches $S_1$–$S_8$ from their recording states to their reproducing states until such time as the amplifying circuit of the apparatus is inoperative, the previously described howling is prevented when the smoothing power circuits 15 and 16 are inadvertently disconnected from the AC power source while the apparatus is in its recording mode of operation. It will further be seen that the holding circuit 17 utilizes the difference between the discharging time constants of the smoothing power circuits 15 and 16 for determining the time during which the change-over of switches $S_1$–$S_8$ from their recording states to their reproducing states is delayed under the described circumstances.

Although the invention has been specifically described and shown herein as being applied to a tape recording and reproducing apparatus, it should be noted that the invention may be similarly applied to any other electrical apparatus having change-over switches for selectively establishing operating modes of the apparatus, and in which it is desired or preferable that the change-over of the switches should be delayed in the event that the apparatus is disconnected from an AC power source while in one of such modes of operation.

Having described an illustrative embodiment of the invention with reference to the accompanying drawing, it is to be understood that the invention is not limited to that precise embodiment, and that various changes and modifications may be effected therein by one skilled in the art without departing from the scope or spirit of the invention as defined in the appended claims.

What is claimed is:

1. The combination of an amplifying circuit, a first smoothing power circuit adapted to be connected to an AC power source for supplying DC power to said amplifying circuit so as to operate the latter and having a relatively large discharging time constant when disconnected from said AC power source, change-over switch means having first and second states, actuating means for said change-over switch means energizable to drive said change-over switch means to said first state and permitting the return of said change-over switch means to said second state upon deenergizing of said actuating means, a second smoothing power circuit also adapted to be connected to the AC power source for supplying DC power to energize said actuating means and having a relatively small discharging time constant when disconnected from said AC power source, and holding circuit means for holding said change-over switch means in said first state thereof for a predetermined time after said first and second smoothing power circuits are disconnected from said AC power source.

2. The combination according to claim 1; in which said holding circuit means is connected with said first smoothing power circuit through said change-over switch means in said first state of the latter so that said relatively large discharging time constant of the first smoothing power circuit establishes said predetermined time that said change-over switch means is held in said first state thereof after said first and second smoothing power circuits are disconnected from the AC power source.

3. The combination according to claim 2; in which said holding circuit means includes a transistor having first and second states and being connected with said first smoothing power circuit in said first state of the change-over switch means, means for maintaining the energizing of said actuating means by the DC power from said first smoothing power circuit in response to said transistor being in said second state of the latter, and means normally maintaining said transistor in said first state of the latter and switching said transistor to said second state of the transistor in response to the disconnection of said first and second smoothing power circuits from said AC power source.

4. The combination according to claim 3; further comprising a power transformer having primary winding means for connection to said AC power source and secondary winding means connected with said first and second smoothing power circuits; and in which said means normally maintaining said transistor in said first state of the latter includes a detecting circuit connected with said secondary winding means to be charged when said primary winding means is connected with said AC power source and to maintain said first state of the transistor in response to the charging of said detecting circuit, and said detecting circuit has a smaller discharging time constant than said first and second smoothing power circuits.

5. The combination according to claim 1; further comprising voltage-controlled control means having operative and inoperative conditions in which said actuating means is energizable by the DC power from said second smoothing power circuit and deenergized, respectively; and in which said holding circuit means is connected with said first smoothing power circuit through said change-over switch means in said first state of the latter for developing a control voltage from said DC power supplied by said first smoothing power circuit after said first and second smoothing power circuits are disconnected from the AC power source, and said control voltage is applied to said control means for maintaining the latter in its operative condition for said predetermined time.

6. The combination according to claim 5; further comprising means for normally applying a control voltage from said second smoothing power circuit to said control means for maintaining the latter in its operative condition when said first and second smoothing power circuits are connected with said AC power source.

7. The combination according to claim 6; in which said holding circuit means includes a transistor having first and second states and being connected with said first smoothing power circuit in said first state of the change-over switch means and with said control means for applying said control voltage to the latter when said transistor is in said second state of the latter, and detecting means maintaining said transistor in said first state of the latter when said first and second smoothing power circuits are connected to said AC power source and switching said transistor to said second state in response to the disconnection of said smoothing power circuits from said AC power source.

8. A recording and reproducing apparatus comprising an amplifying circuit, a first smoothing power circuit adapted to be connected to an AC power source for supplying DC power to said amplifying circuit so as to operate the latter and having a relatively large discharging time constant when disconnected from said AC power source, a second smoothing power circuit also adapted to be connected to said AC power source for producing DC power and having a relatively small discharging time constant when disconnected from said AC power source, auxiliary circuit elements operable by said DC power from the second smoothing power circuit, first and second change-over switch means each having recording and reproducing positions for establishing the requisite connections of said amplifying circuit and auxiliary circuit elements for recording and reproducing operations, respectively, of the apparatus, first and second actuating means for said first and second change-over switch means, respectively, each of said actuating means being energizable by said DC power from said second smoothing power circuit to drive the respective change-over switch means to said recording position and permitting the return of said respective change-over switch means to said reproducing position upon deenergizing of the corresponding actuating means, first and second voltage-controlled control means connected with said first and second actuating means, respectively, and each having operative and inoperative conditions in which the respective actuating means is energizable by the DC power from said second smoothing power circuit and deenergized, respectively, means for applying a control voltage to said first and second control means from said second smoothing power circuit by way of said first change-over switch means when the latter is in said recording position so as to maintain said first and second control means in said operative positions thereof, holding circuit means connected with said first smoothing power circuit through said second change-over switch means in said recording position of the latter for developing an auxiliary control voltage from said DC power supplied by said first smoothing power circuit after said first and second smoothing power circuits have been disconnected from said AC power source, and means for applying said auxiliary control voltage from said holding circuit means to said second control means for maintaining the latter in said operative condition thereof, and thereby continuing said second change-over switch means in said recording position, at least until the DC power from said first smoothing power circuit has declined sufficiently to make said amplifying circuit inoperative upon the disconnection of said first and second smoothing power circuits from said AC power source.

9. A recording and reproducing apparatus according to claim 8; in which said first and second control means are constituted by first and second transistors, respectively, which are conductive and non-conductive in said operative and inoperative conditions, respectively, each of said first and second transistors being connected in series with said respective actuating means and having a base electrode to which a control voltage is applicable for rendering the respective transistor conductive.

10. A recording and reproducing apparatus according to claim 9; in which said holding circuit means includes a third transistor having conductive and non-conductive states and establishing said auxiliary control voltage only in said non-conductive state, and detecting means maintaining said third transistor in said conductive state when said first and second smoothing power circuits are connected to said AC power source and switching said third transistor to said non-conductive state in response to the disconnection of said smoothing power circuits from said AC power source.

11. A recording and reproducing apparatus according to claim 10; in which said detecting means has a discharging time constant substantially smaller than the discharging time constants of said first and second smoothing power circuits.

12. A recording and reproducing apparatus according to claim 8; further comprising first and second input terminals for receiving record-initiation and record-releasing pulse signals, respectively, means connecting said first input terminal with said second control means so that the latter is initially changed to said operative condition thereof in response to the reception of a record-initiation pulse signal, means for initially causing said first control means to assume said operative condition in response to the switching of said second change-over switch means to said recording position of the latter, and means connecting said second input terminal and said first control means to change the latter from its operative condition to its inoperative condition in response to the reception of a record-releasing pulse signal.

13. A recording and reproducing apparatus according to claim 8; further comprising means for applying a control voltage to said first control means from said first smoothing power circuit by way of said second change-over switch means when the latter is in said recording position so as to also maintain said first control means in said operative condition thereof, and thereby also continue said first change-over switch means in said recording position, at least until said DC power from said first smoothing power circuit has declined sufficiently to make said amplifying circuit inoperative upon the disconnection of said first and second smoothing power circuits from said AC power source.

* * * * *